United States Patent [19]
Foister et al.

[11] Patent Number: 4,544,432
[45] Date of Patent: Oct. 1, 1985

[54] METHOD OF BONDING PHOSPHATED STEEL SURFACES ELECTRODEPOSITED WITH A PRIMER

[75] Inventors: Robert T. Foister, Rochester; Richard K. Gray, Warren, both of Mich.

[73] Assignee: General Motors Corporation, Detroit, Mich.

[21] Appl. No.: 614,851

[22] Filed: May 29, 1984

[51] Int. Cl.$^4$ ................................................. C09J 5/02
[52] U.S. Cl. .................... 156/307.3; 156/315; 156/319; 156/330; 428/414; 525/482; 525/486; 525/524
[58] Field of Search ...................... 156/315, 319, 307.3, 156/330; 428/414; 525/482, 524, 486

[56] References Cited

U.S. PATENT DOCUMENTS

| | | | |
|---|---|---|---|
| 3,792,018 | 2/1974 | Logan | 525/524 |
| 3,838,094 | 9/1974 | Sporck | 525/486 |
| 3,923,571 | 12/1975 | Aoki et al. | 156/330 |

Primary Examiner—John J. Gallagher
Attorney, Agent, or Firm—Randy W. Tung

[57] ABSTRACT

A method has been developed to use a structural epoxy adhesive to bond together surfaces of phosphated steel electrodeposited with an organic primer. The specially formulated epoxy adhesive contains a cross-linkable epoxy novolac resin, an epoxy reactive diluent, and an imidazole curing agent substituted in at least one position with an alkyl or a hydroxyalkyl group. The amount of the curing agent used in the formulation is much lower than that in a conventional two-part epoxy adhesive such that the adhesive will not attack or degrade the primer layer to weaken the bond strength. The reactive diluent used reduces the viscosity of the mixed adhesive system to facilitate dispersion and wetting of the adhesive on the coated steel surface. Bond strength achieved by this method is adequate for automotive structural applications and is capable of withstanding extended exposure to humidity, salt spray, and other hostile automotive environments without appreciable loss.

2 Claims, No Drawings

METHOD OF BONDING PHOSPHATED STEEL SURFACES ELECTRODEPOSITED WITH A PRIMER

FIELD OF THE INVENTION

This invention relates to a method of bonding together surfaces of phosphated steel electrodeposited with an organic primer by using a structural epoxy adhesive. The bond strength achieved by this adhesive is sufficient for load bearing structural applications normally required in automotive assemblies.

BACKGROUND OF THE INVENTION

In recent years, advancement made in the development of high strength and fast cure structural adhesives has broadened their application into the area of automotive assembly processes. In the beginning, structural adhesives were used to bond automotive components molded of fiberglass reinforced plastics. For instance, the rear door of some of the full size wagons manufactured by General Motors Corp. is constructed of large pieces molded of sheet molding compound adhesively bonded together by structural adhesives. The Corvette model manufactured by the Chevrolet Division also has molded pieces of fiberglass reinforced plastics bonded together by structural adhesives.

Adhesives have been used in bonding steel parts together in other automobile structures such as in the roof, the door, and other parts of a vehicle. However, the adhesives used in these applications are not of structural strength and are used primarily for sealing purposes to prevent moisture penetration. Problems encountered when attempting to bond load bearing steel components together at sufficient structural strength in an automobile assembly environment are numerous. First, the adhesive must cure to a minimum strength in a reasonably short period of time compatible with automotive assembly operations. Secondly, the adhesive bond must achieve a minimum bond strength sufficient for the assembly to endure normal operating conditions of a vehicle, for instance, to sustain various load and temperature extremes. Thirdly, the adhesive bond must retain its strength after extended high temperature exposure frequently seen in paint bake cycles.

While some conventional 2-part structural adhesives are adequate in bonding non-treated steel surfaces together, their effectiveness is greatly reduced when the steel surfaces are pretreated. Today, virtually all steel components in a vehicle are treated for corrosion protection and for paint process preparations. One of such treatments widely used is the electrodeposition of an organic primer on a phosphated steel surface. In this process, steel surfaces are first phosphated by growing a thin layer of zinc phosphate crystals on ferric oxide, that is, the oxidized surface of bulk steel. An acrylic based primer layer is then deposited on top of the zinc phosphate. The thickness of this layer depends on the particular process but typically is in the range of from about 1 to 10 microns.

One of the most widely used structural adhesives is of the epoxy type. When a conventional 2-part epoxy formulation typically having a mix ratio of 1:1 is used on steel surfaces electrodeposited with an organic primer, very low initial strength is obtained. The strength loss after water soak and salt spray environments are also extensive. These undesirable results were traced to chemical and physical degradation of the organic primer used in the electrodeposition process. Visual inspection of the failure surfaces revealed a mixed failure mode in the phosphate/primer/adhesive interface region. In addition, certain surfaces exhibited extensive blistering and degradation of the organic primer layer. There is sufficient indication that the organic primer was attacked and degraded by the epoxy adhesive.

OBJECT OF THE INVENTION

It is therefore an object of this invention to provide a method of bonding together phosphated steel surfaces electrodeposited with an organic primer by using a novel epoxy adhesive; such adhesive will not attack or degrade the organic primer layer so as to destroy the bond strength.

It is another object of this invention to provide a method of bonding wherein a novel thermoset epoxy adhesive cures rapidly at reasonable temperatures, develops high bond strength after a short cure time, and will not weaken substantially upon extended exposure to temperatures up to about 200° C.

A more particular object is to provide an adhesive bond that will retain its bond strength at temperatures as low as $-80°$ C. and as high as $+200°$ C.

It is yet another object to provide a method of bonding steel surfaces electrodeposited with an organic primer together such that the bonded joint can withstand extended exposure to humidity, salt spray, and other hostile environments without appreciable loss of bond strength.

SUMMARY OF THE INVENTION

In accordance with the preferred practice of our invention, these objects may be accomplished by first formulating a thermoset epoxy adhesive as follows. The amount of each constituent is in parts by weight unless otherwise stated.

The principal constituent of the subject adhesive for bonding steel surfaces electrodeposited with an organic primer of acrylic base is a phenolformaldehyde novolac resin. The resin preferably has an epoxide functionality greater than two, but in no case should the functionality be so low that the polymer does not cross link when cured.

For each 100 parts epoxy novolac resin, about 40 to 60 parts of an aliphatic epoxy reactive diluent is added. This reactive diluent reduces the viscosity and improves the processibility of the epoxy adhesive in the production process.

The third constituent in this epoxy formulation is the catalyst. Based on the assumption that high levels of amine curing agents are likely causes of primer degradation, a formulation of the epoxy adhesive was made by using a single imidazole catalyst at a much lower concentration. For instance, the ratio in parts by weight between the epoxy resin and the catalyst of a conventional 2-part adhesive is near 1:1. This ratio is drastically increased to approximately 12:1 in the current invention to reduce the catalyst content. The imidazole curing agent used is substituted in at least one position with an alkyl or a hydroxyalkyl group. The preferred catalyst is 1-(2-hydroxy propyl)-2-methyl-imidazole which is incorporated in an amount of from 11 to 16 parts by weight.

Fillers such as natural silica, thixotropic colloidal silica, and color pigment can also be added to further modify the property of the adhesive. Natural amorphous silica powder having average particle sizes in the range of from about 2 to 100 microns is generally preferred. The silica increases the viscosity of the epoxy resins and curing agents. Once the epoxy is cured, the silica provides reinforcement to the adhesive improving its long term adhesive qualities and stabilizing it to some extent over a wide temperature range. The silica powder is usually dried for a minimum of sixteen hours at 150° C. prior to its use. Thixotropic colloidal silica is used in a small amount, preferably about 2 to 8 parts, to improve the handling properties of the adhesive by eliminating the tendency of the uncured adhesive to be stringy. Color pigments are generally used either as a guide for mixing the components or as a disguise to hide the cured adhesive.

When used in production processes, the adhesive would preferably be made in two parts, one part containing the epoxies, and the other the catalyst. The parts would be metered and mixed together immediately before use. The composition after mixing can be used at room temperature for a period of at least several hours. When cured at 150° C. for three minutes, it forms a strong adhesive bond adequate for automotive assembly requirements.

Our invention is a method of applying a novel formulation of epoxy adhesive containing an epoxy novolac resin, an epoxy-based reactive diluent, and a catalyst onto a steel surface phosphated and electrodeposited with an organic primer, pressing it against another steel surface with or without primer coating, and holding it under sufficient pressure for a suitable period of time so that an adhesive bond of sufficient bond strength is formed. This novel adhesive cures to form a permanent bond after the application of heat in a short period of time. It does not attack the organic primer layer electrodeposited on the surface of a phosphated steel part. The adhesive bond achieved is not sensitive to the presence of moisture, and is resistant to such hostile automotive environments as salt spray and other severe conditions. The adhesive properties are substantially retained in a temperature range from as low as −80° C. to as high as +200° C. The bond strength is not weakened on extended exposure to temperatures up to about 200° C.

DETAILED DESCRIPTION

The epoxy resin used in this invention belongs to a family characterized as polynuclear phenol glycidyl ether derived resins. This type of cross-linkable epoxy novolac resin having the basic structure of

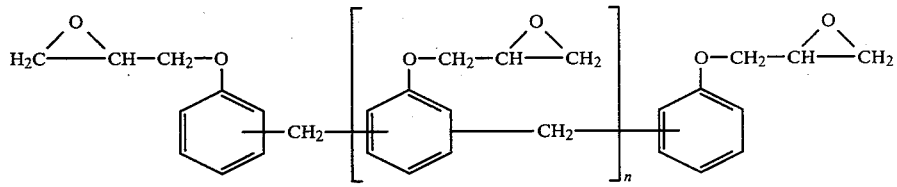

A preferred resin is D.E.N. 431, sold by the Dow Chemical Company. A comparable resin is E.P.N. 1139, sold by the Ciba-Geigy Company. D.E.N. 431 has characteristics as set out in the following table:

| DEN 431 - Epoxy Phenol Novolac | |
| --- | --- |
| n value | 0.2 |
| epoxide equiv. wt. | 175 |

| DEN 431 - Epoxy Phenol Novolac (continued) | |
| --- | --- |
| epoxy functionality | 2.2 |
| viscosity, centipoise at 52° C. | 1400 |
| softening point, Durran | 1 |
| heat distortion, °C.* | 156(165) |

*Cured with methylenedianiline: gelled 16 hours at 55° C. + 2 hours at 175° C. No. in parenthesis additional 4 hours at 200° C.

These epoxy resins are cross-linkable in epoxy groups forming thermally stable cured adhesives. They are prepared from phenol-formaldehyde condensation polymerization products and preferably having an epoxide equivalent weight in the range of from about 150 to 200 and a viscosity at about 50° C. in the range of from about 1000 to 2000 centipoise.

The second important constituent having significant effect on the properties of the epoxy adhesive is the imidazole curing agent. We have found that an imidazole curing agent substituted in at least one position with an alkyl or a hydroxyalkyl group, such as 1-methylimidazole, 2,4-ethyl-methyl-imidazole, or 1-(2-hydroxy propyl)-2-methyl-imidazole is suitable for this purpose. The percentage of imidazole curing agent used was from about 11 to 16 parts by weight.

The third important gradient of the epoxy formulation is a reactive diluent for the epoxy. A trifunctional reactive diluent of triglycidyl ether which is a reaction product of a trifunctional alcohol such as glycerol or trimethylolpropane and an epichlorohydrin having an epoxide equivalent weight in the range of from about 130 to 170 and a viscosity at 25° C. in the range of from about 120 to 240 is used in the amount of from 40 to 60 parts by weight. The extremely low viscosity of the triglycidyl ether, i.e., 180 centipoise at room temperature, greatly reduces the viscosity of the final mixed product so that it can be adequately dispersed on steel surfaces to be bonded.

Two different formulations of epoxy adhesives were used in this study for bonding phosphated steel surfaces electrodeposited with an organic primer. They are designated as EA-1 and EA-2 for easier identification. Their formulations are shown in table I.

TABLE I

| | Composition (Parts by Weight) | |
| --- | --- | --- |
| Components | Part A | Part B |
| EA1 | | |
| DEN 431 | 100 | — |
| Epi-Rez 5048 | 50 | — |
| Versamid 140 | — | 54 |
| Epi-Cure 874 | — | 4.5 |
| Dicyandiamide | — | 7.5 |
| EA2 | | |
| DEN 431 | 100 | — |
| Epi-Rez 5048 | 50 | — |
| AP-5 | — | 14 |

The organic primer used in the electrodeposition process of phosphated steel surfaces is Uniprime 3043, an acrylic type cathodic primer commercially available from the PPG Co. Adhesive mixing and dispensing was carried out with a Liquid Control Corporation (model CVR 2525) laboratory scale metering and mixing unit.

Table II lists a commercial source and a brief description for each constituent in EA-1 and EA-2.

TABLE II

| Materials and Suppliers | | |
|---|---|---|
| Tradename | Supplier | Description |
| DEN 431 | Dow Chemical Co. | Phenol formaldehyde epoxy resin |
| Epi-Rez 5048 | Celanese Corp. | Aliphatic trifunctional epoxy modifier |
| Versamid 140 | Shell Corp. | Polyamide curing agent |
| Epi-Cure 874 | Celanese Corp. | Proprietary curing agent |
| Dicyandiamide | Eastman Chemical Co. | Curing agent |
| AP-5 | Archem Corp. | 1-(2-hydroxy propyl)-2 methyl-imidazole curing agent |

Determinations of bond strengths were conducted on standard ASTM D-1002 lap shear and torsional impact coupons. The steel coupons were first phosphated by the Chemfil process #168, then primed with Uniprime 3043 prior to bonding. Test specimens were prepared by first mixing the two parts of the epoxy adhesive together in a laboratory metering and mixing unit; spreading the mixed adhesive onto at least one of the steel surfaces to be bonded; pressing and then holding the two surfaces together for a sufficient length of time to achieve an initial bond.

The curing of the adhesives was conducted by two different methods, by oven heat or by induction heat. Oven cure consisted of subjecting the samples to a 200° C. forced air oven for 25 minutes. The second method of curing involved inductive heating of the steel coupons using electromagnetic energy supplied by a Pulsonix Magnetic Thermal Generator (Dimensional Research Corporation model PI 5000-A). Energy dissipated by the induced current heats the surface of the specimen in contact with the adhesive, thereby initiating rapid cure. Surface temperature studies indicated that the maximum surface temperature generated under the conditions (2.5 seconds, 100% power) is approximately 180°–200° C. This method provided excellent handling strength for the samples prior to the thermal cycling or the post-cure of the specimens.

All test specimens except those tested immediately and after room temperature exposure were post-cured through a simulated paint-bake cycle prior to environmental exposure. The cycle consisted of the following sequence:
1. 75 minutes at 160° C.
2. cold tap water quench
3. 30 minutes at 135° C.
4. room temperature cooling for 45 minutes
5. 20 minutes at 135° C.
6. room temperature cooling for 45 minutes
7. 40 minutes at 160° C.

Lap shear specimens were tested on an Instron test machine using a crosshead speed of 1.27 millimeters per minute. Lap shear strength in kilopascals is reported as the maximum load reached prior to bond rupture. Torsional impact testing was carried out on a Tinius Olson impact test machine according to a General Motors standard test designated as Fisher Body Test Method 45-76.

Effects of environmental exposure were compared to controlled samples after a seven-day, 60° C. water immersion, and after an eight-week (5% NaCl at 38° C.) salt spray environment. The controlled specimens were tested after a room temperature exposure of 7 days, and both water immersion and salt spray samples were tested within two hours after removal from their environments.

Our initial attempt to bond Uniprime 3043 coated samples with the EA-1 adhesive system was not successful. With the exception of the 9-day room temperature cure, both lap shear and torsional impact specimens show unacceptably low initial and control strengths, as well as extensive strength loss in water soak and salt spray environments. These data are presented in tables III and IV for the lap shear and torsional impact respectively. It is to be noted that for satisfactory automotive applications, a minimum of about 15,000 joules per square meter torsional impact strength is required after the adhesive is cured at 200° C. for 25 minutes and tested at room temperature. In addition to the initial strength requirement, the bond strength must retain at least about 12,000 joules per square meter when tested at room temperature after 8 weeks continuous exposure in a salt spray environment and after 7 days immersion in water at 60° C.

TABLE III

| Lap Shear Strengths, EA1 and EA2 on Uniprime 3043 | | | | |
|---|---|---|---|---|
| Adhesive | Cure | Environment | Avg. Strength (kPa) | Failure Mode |
| EA1 | Induction | Immediate test | 9 488 | primer/adhesive/phosphate, |
|  | Induction/paint[1] | Control | 4 393 | with extensive degradation |
|  | " | H₂O Soak | 2 378 |  |
|  | Oven/paint | Control | 4 805 |  |
|  | " | H₂O soak | 2 322 |  |
|  | Induction/paint | Control | 4 393 |  |
|  | " | Salt spray | 1 927 |  |
|  | Oven/paint | Control | 4 805 |  |
|  | " | Salt spray | 1 172 |  |
|  | Room temp. (9 day) | Room temp. test | 12 204 |  |
| EA2 | Induction | Immediate test | 16 337 | Cohesive within bulk |
|  | Induction/paint | Control | 29 078 | adhesive layer |
|  | " | H₂O soak | 27 218 | primer/phosphate, |
|  | Oven/paint | Control | 28 985 | no degradation |
|  | " | H₂O soak | 27 621 |  |
|  | Induction/paint | Salt spray | 27 435 |  |
|  | Oven/paint | Salt spray | 29 698 |  |

TABLE III-continued

Lap Shear Strengths, EA1 and EA2 on Uniprime 3043

| Adhesive | Cure | Environment | Avg. Strength (kPa) | Failure Mode |
|---|---|---|---|---|
| | Room temp./paint | Room temp. test | 27 528 | |

[1]Simulated paint-bake cycle.

TABLE IV

Torsional Impact Strengths, EA1 and EA2 on Uniprime 3043

| Adhesive | Cure | Environment | Avg. Strength (Jm$^{-2}$) | Failure Mode |
|---|---|---|---|---|
| EA1 | Induction | Immediate test | 5 609 | primer/adhesive/phosphate |
| | Induction/paint[1] | Control | 2 314 | with extensive degradation |
| | " | H$_2$O soak | 2 700 | |
| | Oven/paint | Control[2] | — | |
| | " | H$_2$O soak[2] | — | |
| | Induction/paint | Control | 2 314 | |
| | " | Salt spray | 3 155 | |
| | Oven/paint | Control[2] | — | |
| | " | Salt spray[2] | — | |
| | Room temp. (9 day) | Room temp. test | 10 623 | |
| EA2 | Induction | Immediate test | 7 181 | Cohesive within bulk |
| | Induction/paint | Control | 23 294 | adhesive layer |
| | " | H$_2$O soak | 27 567 | primer/phosphate, |
| | Oven/paint | Control | 17 830 | no degradation |
| | " | H$_2$O soak | 19 616 | |
| | Induction/paint | Salt spray | 20 526 | |
| | Oven/paint | Salt spray | 14 747 | |
| | Room temp./paint | Room temp. test | 21 052 | |

[1]Simulated paint bake cycle.
[2]Inconsistent results.

Visual inspection of the failure surfaces revealed a mixed failure mode in the phosphate/organic primer/adhesive interface region. In addition, certain surfaces exhibited extensive blistering and degradation of the organic primer layer. A foam-like cellular structure at the failure surfaces was seen under electron scanning microscope examination. At higher magnification, these foam cells often show a central region of exposed phosphate crystals, an indication that in all likelihood the underlying phosphate layer is exposed by a physical or chemical etching action during bond formation, rather than upon fracture.

No readily apparent qualitative differences were observed in the primer degradation between the induction and the oven-cured specimens. Likewise, there were no significant differences in strength or strength retention for samples cured by the two methods.

The observation of cell-like structure was not limited to water-soaked specimens, nor just to lap shear specimens. The structure also appeared in failure surfaces of specimens that were tested immediately after bonding by the torsional impact method. Close inspection also reveals regions containing exposed phosphate crystals. It is clear that the foaming or etching which created the cells occurred locally within the primer region, rather than in the adhesive. This region of degradation gives rise to a weak interface which becomes the location for stress concentration. It also accelerates the accumulation of moisture in the bonded joint by a wicking action.

Confronted with evidence of primer degradation by the adhesive, we attempted to isolate the components of the adhesive causing the problem. Assuming that one or several of the catalysts in EA-1 were responsible, we placed drops of the catalysts on a primed steel coupon. The specimens were then heated in an oven at 100° C. for 5 minutes. All the catalysts gave the appearance of solubilizing the primer, as evidenced by dissolution of the primer in the liquid catalyst drop. Furthermore, light scraping of the exposed area of the coupon with a wooden stick completely disposed the organic primer layer, leaving what appeared to be a bare metal surface. It appeared that one or more catalysts were responsible for the degradation observed on the various failure surfaces. However, when pure resin and diluent were tested in a similar manner, they also caused weakening of the primer, so that light scraping with a wooden stick exposed bare metal.

Primer degradation due to the contact of individual liquids at elevated temperatures was shown to be a general phenomenon. This degradation occurred over a wide temperature range, with a wide variety of different primers, and with a number of high boiling liquids (Table V). With reference to Table V, several of the amine type curing agents (Versamid 140, Epi-Cure 874, dicyandiamide, diethylene triamine) and imidazole catalysts (1-(2-hydroxy propyl)-2-methyl-imidazole, AP-5) were particularly harmful. Significantly, the base resin (DEN 431) and diluent (Epi-Rez 5048) for EA-1 and EA-2 also attacked the primer surface at a temperature of 120° C.

TABLE V

UNIPRIME 3043 DEGRADATION TEMPERATURES

| Liquid | Degradation Temperature (°C.)[1] |
|---|---|
| DEN 431 (Dow) | 120 |
| Epon 825 (Shell)[2] | 116 |
| Epi-Rez 5048 (Celanese) | 120 |
| Versamid 140 (Shell) | 119 |
| Phenyl Glycidyl Ether (Aldrich)[3] | 74 |
| Diethylene Triamine (Aldrich)[4] | 71 |
| 2-Ethyl-4-Methylimidazole (BASF Wyandotte) | 94 |
| Epi-Cure 874 (Celanese) | 98 |
| AP-5 (Archem) | 105 |
| Mineral Oil (Sargent Welch)[5] | 154 |

TABLE V-continued

UNIPRIME 3043 DEGRADATION TEMPERATURES

| Liquid | Degradation Temperature (°C.)[1] |
|---|---|
| Glycerol (Aldrich)[5] | 165 |

[1] Temperature at which light probing with wooden stick first removed primer.
[2] A diglycidyl ether of bis-phenol A
[3] A reactive diluent
[4] A curing agent
[5] An inert material We expanded our study of primer degradation by performing tests similar to those described above, on a number of different primer systems, with a range of curing agents, resins, diluents, and high boiling liquids. As shown in table VI, the phenomenon of chemical and physical degradation of primers is not confined to the system we have used in the adhesion studies. Degradation can commence at a temperature as low as 70° C. on normal-baked Inmont 1059, or as high as 141° C. on PPG 3002 primer.

TABLE VI

Primer Degradation Temperatures (°C.)
Primer (N = normal bake, O = over-baked)

| Liquid | 3043-N | 3002 V-O | 3002 V-N | 3048-N | 3050-N | 3050-O | 3150-O | 3250-N | 1045-N | 1059-N |
|---|---|---|---|---|---|---|---|---|---|---|
| DEN 431 | 120 | 124 | 141 | 119 | 126 | 130 | 133 | 126 | 131 | 129 |
| Epon 825 | 116 | 128 | 140 | 125 | 122 | 124 | 136 | 125 | 128 | 126 |
| Epi-Rez 5048 | 120 | 127 | 134 | 125 | 123 | 125 | 126 | 123 | 123 | 119 |
| Versamid 140 | 119 | 122 | 124 | 122 | 124 | 125 | 123 | 116 | 124 | 120 |
| Phenyl Glycidyl Ether | 74 | 80 | 75 | 77 | 75 | 75 | 73 | 72 | 73 | 70 |
| Diethylene Triamine | 71 | 75 | 75 | 68 | 72 | 71 | 74 | 72 | 75 | 73 |
| 2-Ethyl-4-Methylimidazole | 94 | 112 | 114 | 111 | 115 | 114 | 109 | 112 | 112 | 112 |
| Mineral oil | 154 | — | — | — | — | — | — | — | — | — |
| Glycerol | 165 | — | — | — | — | — | — | — | — | — |

Primers
3002V-Cathodic electrodeposited primer (PPG)
3043-Uniprime Cathodic electrodeposited primer (PPG)
3048-Uniprime Cathodic electrodeposited primer (PPG)
3050-Uniprime Cathodic electrodeposited primer (PPG)
3150-Uniprime Cathodic electrodeposited primer (PPG)
3250-Uniprime Cathodic electrodeposited primer (PPG)
1045-Cathodic electrodeposited primer (Inmont)
1059-Cathodic electrodeposited primer (Inmont)

Taking into consideration that high levels of curing agents in EA-1 are likely causes of the primer degradation, we re-formulated the adhesive by substituting a single catalyst at a much smaller concentration (See EA-2 in table I). The epoxy resin and diluent were not changed for this new formulation.

This new formulation uses the same base resin and curing agent as that in a previously patented adhesive by one of the inventors, Richard K. Gray, hereinafter referred to as the SMC adhesive under U.S. Pat. No. 4,383,060. This patented adhesive was specifically designed to bond together structurally automotive parts molded of glass fiber reinforced sheet molding compound. However, major differences in the processibility and applicability exist between the two systems. In the SMC adhesive, the incorporation of an epoxy flexibilizer consisting of an adduct of diglycidyl ether of bisphenol-A and an alkyl ester of a fatty acid was important to improve the impact and low temperature properties of the adhesive. This flexibilizer, having a viscosity at room temperature twice as high as that of the base epoxy resin, greatly increases the viscosity of the final mixed product. It is practically impossible to apply the SMC adhesive on steel surfaces because of the high viscosity and the resulting poor dispersion and wetting characteristics of the system. In the adhesive used in the current invention, a reactive diluent, instead of a flexibilizer, is incorporated into the system. Generally, diluents are added to decrease the viscosity and to make the mixing and handling of the adhesive easier. They allow more filler to be used in the resin and give better wetting characteristics on the surfaces to be adhered to. A reactive diluent contains epoxide groups which participate in the polymerization reactions and become chemically bonded to the network. A multifunctional reactive diluent, such as a trifunctional reactive diluent of triglycidyl ether used in the current invention, is desirable since it does not reduce the cross-linking density of the system. The viscosity of triglycidyl ether at room temperature is 180 centipoise, more than two orders of magnitude smaller than that of the base epoxy resin (42,000 centipoise). This low viscosity additive makes it possible for the final mix to have the necessary dispersion and wetting characteristics for bonding steel surfaces coated with an organic primer together, i.e., a low viscosity of 4400 centipoise is obtained at room temperature when 50 parts by weight of diluent is added. The triglycidyl ether used in EA-2 is a reaction product of a trifunctional alcohol such as glycerol or trimethylolpropane and an epichlorohydrin having an epoxide equivalent weight of 145. It is commercially available from Celanese Corp. under the tradename of Epi-Rez 5048.

In marked contrast to EA-1, tables III and IV show EA-2 has very high initial and control strengths, as well as excellent strength retention for both water soaked and salt spray exposures. Unlike the EA-1/Uniprime 3043 failure surfaces, which show blistered cell structure and general degradation of the primer, no signs of degradation were apparent on any of the EA-2/Uniprime 3043 surfaces examined under the scanning electron microscope. All test specimens produced similar failure surfaces which occurred at the phosphate/primer interface. It is significant that none of the scanning electron micrographs revealed any evidence of primer degradation at the failure surface. It can be concluded that by re-formulating the adhesive and reducing the high concentration of curing agents presented in EA-1, a major source of primer degradation was eliminated.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of adhesively bonding together surfaces of two steel components where at least one such surface is phosphated and electrodeposited with an organic primer comprising the steps of: applying to at least one such surface a heat curable two-part epoxy adhesive where the adhesive resin comprises in parts by weight 100 parts of a cross-linkable epoxy novolac resin having an epoxide equivalent weight in the range of from 150 to 200 and a viscosity at 50° C. in the range of from about 1000 to 2000 centipoise; from about 40 to 60 parts of an aliphatic epoxy reactive diluent which is the reaction product of a trifunctional alcohol and an epichlorohydrin having an epoxide equivalent weight in the range of from about 130 to 170 and a viscosity at 25° C. in the range of from about 120 to 240; from about 11 to 16 parts of imidazole curing agent substituted in at least one position with an alkyl or a hydroxyalkyl group; pressing and holding the two steel components together forming a permanent bond.

2. A method of adhesively bonding together surfaces of two automotive steel components where at least one is phosphated and electrodeposited with an organic primer comprising the steps of: applying to at least one such surface a heat curable two-part epoxy adhesive where the adhesive resin comprises in parts by weight 100 parts of a cross-linkable epoxy novolac resin having an epoxide equivalent weight in the range of from 150 to 200 and a viscosity at 50° C. in the range of from about 1000 to 2000 centipoise; from about 40 to 60 parts of an aliphatic epoxy reactive diluent which is the reaction product of a trifunctional alcohol and an epichlorohydrin having an epoxide equivalent weight in the range of from about 130 to 170 and a viscosity at 25° C. in the range of from about 120 to 240; from about 11 to 16 parts of imidazole curing agent substituted in at least one position with an alkyl or a hydroxyalkyl group; pressing and holding the two steel components together wherein said adhesive forms a bond between surfaces of said steel components of at least about 15,000 joules per square meter when the adhesive is cured at 200° C. for 25 minutes and tested at 25° C.; said adhesive retaining a bond strength of at least about 12,000 joules per square meter when tested at 25° C. after 8 weeks continuous exposure to 5% sodium chloride salt spray solution at 37.8° C., and after 7 days immersion in water at 60° C.

* * * * *